(12) United States Patent
Anderson et al.

(10) Patent No.: US 9,354,707 B2
(45) Date of Patent: May 31, 2016

(54) COMBINATION COLOR AND PEN PALETTE FOR ELECTRONIC DRAWINGS

(71) Applicant: Citrix Systems, Inc., Fort Lauderdale, FL (US)

(72) Inventors: Matthew Anderson, New York, NY (US); Frederic Mayot, Oakland, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 277 days.

(21) Appl. No.: 14/097,320

(22) Filed: Dec. 5, 2013

(65) Prior Publication Data

US 2015/0058807 A1 Feb. 26, 2015

Related U.S. Application Data

(60) Provisional application No. 61/869,038, filed on Aug. 22, 2013.

(51) Int. Cl.

| | |
|---|---|
| *G06F 3/0482* | (2013.01) |
| *G06F 3/01* | (2006.01) |
| *G06T 11/80* | (2006.01) |
| *G06F 3/0481* | (2013.01) |
| *G06F 3/0484* | (2013.01) |
| *G06F 3/0488* | (2013.01) |
| *H04L 29/08* | (2006.01) |

(Continued)

(52) U.S. Cl.
CPC .............. *G06F 3/017* (2013.01); *G06F 3/0482* (2013.01); *G06F 3/0488* (2013.01); *G06F 3/04812* (2013.01); *G06F 3/04817* (2013.01); *G06F 3/04842* (2013.01); *G06F 3/04883* (2013.01); *G06Q 10/10* (2013.01); *G06T 11/60* (2013.01); *G06T 11/80* (2013.01); *H04L 67/1095* (2013.01)

(58) Field of Classification Search
CPC ..... G06F 3/0482; G06F 3/0488; G06F 11/60; G06F 11/80
See application file for complete search history.

(56) References Cited

U.S. PATENT DOCUMENTS

| | | | |
|---|---|---|---|
| 6,674,459 B2 | 1/2004 | Ben-Shachar | |
| 6,919,893 B2 * | 7/2005 | Tobita | ..................... G06T 11/00 345/473 |

(Continued)

FOREIGN PATENT DOCUMENTS

EP    2626779 A2    8/2013

OTHER PUBLICATIONS

TheGeekdad: "How to use Drawing Pad for the i Pad (Version 2.4)", May 31, 2013, XP054975544, Retrieved from the Internet: URL:https://www.youtube.com/watchZv=Gzg3kl8tCtM.

(Continued)

*Primary Examiner* — Anil Bhargava
(74) *Attorney, Agent, or Firm* — BainwoodHuang

(57) ABSTRACT

An improved technique involves embedding a pen selection within a selected color. When a user selects a color for a new stroke by moving a cursor over a color icon, a pen palette appears within the selected color icon. In some arrangements, the improved techniques further involve automatically selecting a pen by default as the previous pen used for that color, so that only a single color selection need be made rather than separate pen and color selections. In this way, the user may then quickly and fluidly select both a color, then a pen for a drawing stroke. Such a color and pen selection process may be seen to simulate the actions in drawing on a whiteboard.

16 Claims, 5 Drawing Sheets

(51) Int. Cl.
*G06Q 10/10* (2012.01)
*G06T 11/60* (2006.01)

(56) References Cited

U.S. PATENT DOCUMENTS

| | | | |
|---|---|---|---|
| 6,970,712 B1 | 11/2005 | Vo | |
| 2003/0161014 A1* | 8/2003 | Tobita | G06T 11/00 358/537 |
| 2004/0160427 A1* | 8/2004 | Keely, Jr. | G06F 3/0483 345/179 |
| 2004/0212617 A1* | 10/2004 | Fitzmaurice | G06F 3/0481 345/440 |
| 2006/0072828 A1* | 4/2006 | Silverbrook | G06F 3/0317 382/203 |
| 2008/0191024 A1* | 8/2008 | Napper | G06F 3/0317 235/462.12 |
| 2011/0216001 A1* | 9/2011 | Song | G06F 3/033 345/157 |
| 2013/0132053 A1* | 5/2013 | Mech | G06T 13/80 703/9 |
| 2013/0212535 A1* | 8/2013 | Kim | G06F 3/0482 715/841 |
| 2013/0235074 A1* | 9/2013 | Cherna | G06T 11/60 345/619 |
| 2014/0040789 A1* | 2/2014 | Munter | G06F 8/34 715/762 |
| 2014/0049479 A1 | 2/2014 | Robinson et al. | |
| 2014/0184531 A1* | 7/2014 | Demiya | G06F 3/04883 345/173 |
| 2015/0154444 A1* | 6/2015 | Kurita | G06F 3/04883 715/268 |

OTHER PUBLICATIONS

International Search Report (PCT/US2014/048854), Form PCT/ISA/210 & PCT/ISA/220, 4 pages, Mailing Date: Oct. 17, 2014.

* cited by examiner

COMBINATION COLOR AND PEN PALETTE FOR ELECTRONIC DRAWINGS

CROSS REFERENCE TO RELATED APPLICATIONS

This Patent Application is a Non-provisional which claims the benefit under 35 U.S.C. of §119(e) of U.S. Provisional Patent Application No. 61/869,038 filed on Aug. 22, 2013, entitled, "SYSTEM AND METHOD FOR INTUITIVE EDITING USING DRAWING COLLABORATION TOOL", the contents and teachings of which are hereby incorporated by reference in their entirety.

BACKGROUND

Electronic drawing tools allow users to draw freehand pictures on a display of a computer. Such electronic drawing tools includes a brush palette for selecting a brush that simulates a type of brush or pen that applies a brush stroke, a color palette for selecting a color for the brush stroke, and various auxiliary tools such as an erase button, an undo button, and a redo button for correcting mistakes. A user may provide a brush stroke on the display by moving an input device, e.g., a mouse or a stylus, along a desired stroke path.

Conventional electronic drawing tools have separate areas for selecting a brush and then selecting a color in which a stroke is to be drawn on a display. For example, in some arrangements, an electronic drawing tool may invoke brush selection via a first drop-down menu, and then color selection via a second drop-down menu. In other arrangements, an electronic drawing tool may invoke brush selection via graphical elements arranged in a first window and then color selection via graphical elements arranged in a second window distinct from the first.

SUMMARY

Unfortunately, there are deficiencies with the above-described conventional electronic drawing tools. For example, having a user select brushes and then colors from separate work areas makes for a burdensome user experience. Each new stroke requires two actions from the user separated over a significant amount of space, even for a simple color change. In most cases, those separated actions can dramatically increase the time required to draw even a simple picture; such an increased time can vastly affect communication when such a drawing tool is used within a collaborative environment such as an online meeting.

In contrast with the above-described conventional electronic drawing tools in which the separate selection of a brush and then a color provide for a burdensome user experience, an improved technique involves embedding a pen selection within a selected color. When a user selects a color for a new stroke by moving a cursor over a color icon, a pen palette appears within the selected color icon. In some arrangements, the improved techniques further involve automatically selecting a pen by default as the previous pen used for that color, so that only a single color selection need be made rather than separate pen and color selections. In this way, the user may then quickly and fluidly select both a color, then a pen for a drawing stroke. Such a color and pen selection process may be seen to simulate the actions in drawing on a whiteboard.

One embodiment of the improved technique is directed to a method of operating an electronic drawing tool. The method includes rendering a drawing window of the electronic drawing tool within a display of a user device, the drawing window including a color palette, the color palette including color icons. The method also includes displaying a pen palette embedded within the selected color icon in response to receiving a color selection command from a user to select a color icon of the color palette. The method further includes rendering a drawing stroke within the drawing window in a color and pen style indicated by the selected color icon and selected pen icon, respectively, after receiving a pen selection command from the user to select a pen icon of the pen palette.

Additionally, some embodiments of the improved technique are directed to an apparatus constructed and arranged to operate an electronic drawing tool. The apparatus includes memory and a set of processors coupled to the memory to form controlling circuitry. The controlling circuitry is constructed and arranged to carry out the method of operating an electronic drawing tool.

Furthermore, some embodiments of the improved technique are directed to a computer program product having a non-transitory computer readable storage medium which stores code including a set of instructions which, when executed by a computer, cause the computer to carry out the method of operating an electronic drawing tool.

In some arrangements, rendering the drawing window includes displaying, as the color palette, a linear array of color icons located at an edge of the display.

In some arrangements, the color icons of the color palette each include a rectangular block having a color that is substantially the color in which the drawing stroke is rendered in the drawing window. Displaying the pen palette embedded within the selected color icon includes revealing the pen palette within the rectangular block of the selected color icon.

In some arrangements, the method further includes receiving the color selection command from the user to select a color icon of the color palette. Revealing the pen palette within the rectangular block of the selected color icon includes expanding the rectangular block of the selected color icon to display the pen icons of the pen palette.

In some arrangements, the method further includes receiving the pen selection command from the user to select a pen icon of the pen palette, and highlighting the selected pen icon within the expanded rectangular block of the selected color icon in response to receiving the pen selection command.

In some arrangements, the method further includes receiving a second color selection command from the user to select another color icon of the color palette distinct from a current selected color icon, receiving a third color selection command from the user to select the current selected color icon, and highlighting the pen icon of the pen palette embedded within the other selected color icon that was the highlighted pen icon of the pen palette embedded within the current selected color icon prior to receiving the second color section command.

In some arrangements, the linear array of color icons is located at the bottom of the display of the user device and the rectangular block of each color icon of the color palette has a specified width, a sum of the specified widths of the rectangular blocks exceeding a width of the display of the user device. Receiving the color selection command from the user to select a color icon of the color palette includes receiving a swipe command configured to move the color icons of the color palette toward the left or the right of the display.

In some arrangements, the linear array of color icons is visible within a bounding box within the display of the user device and a rectangular block at an edge of the bounding box is partially exposed within the display. Expanding the rectangular block of the selected color icon to display the pen icons of the pen palette includes displaying the expanded rectangular block in full within the bounding box when the selected color icon is a partially exposed rectangular icon.

In some arrangements, the drawing window further includes an auxiliary function bar for invoking auxiliary functions within the drawing window. Rendering the drawing window of the electronic drawing tool within the display of the user device includes displaying the bounding box to one side of the bounding box.

In some arrangements, the display of the user device is a touch display configured to respond to touch gestures from the user. Receiving the swipe command includes detecting a swipe gesture on the display, a direction of motion of the linear array of color icons across the display being based on a direction of the detected swipe gesture.

In some arrangements, receiving the color selection command from the user to select a color icon of the color palette further includes detecting a poke gesture on a color icon of the color palette, and designating, as the selected color icon, the color icon of the color palette on which the poke gesture was detected.

In some arrangements, receiving the pen selection command from the user to select a pen icon of the pen palette includes detecting a poke gesture on a pen icon of the pen palette and designating, as the selected pen icon, the pen icon of the pen palette on which the poke gesture was detected.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves embedding a pen selection within a selected color. When a user selects a color for a new stroke by moving a cursor over a color icon, a pen palette appears within the selected color icon. In some arrangements, the improved techniques further involve automatically selecting a pen by default as the previous pen used for that color, so that only a single color selection need be made rather than separate pen and color selections. In this way, the user may then quickly and fluidly select both a color, then a pen for a drawing stroke. Such a color and pen selection process may be seen to simulate the actions in drawing on a whiteboard.

Figure 1:
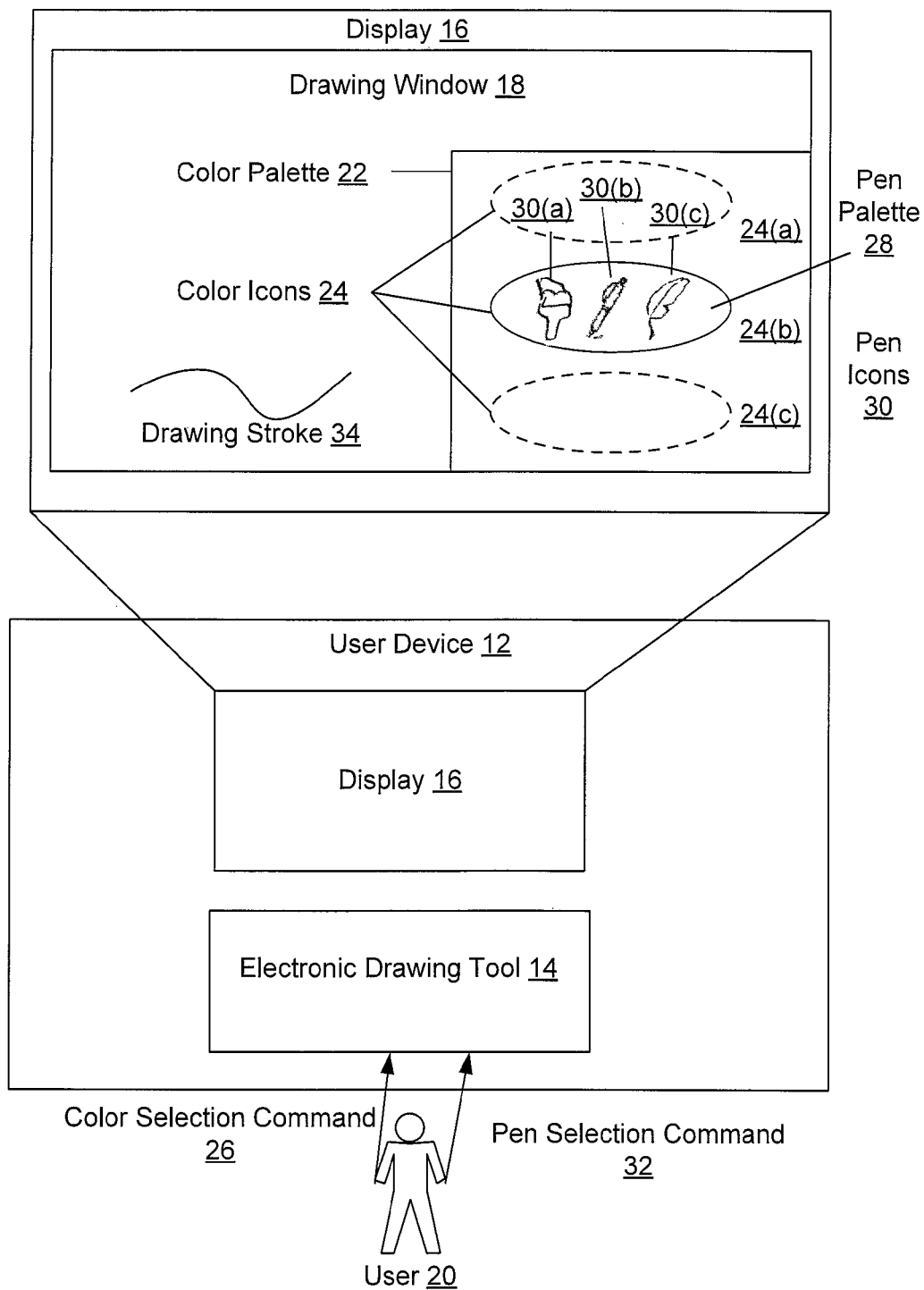
FIG. 1 is a block diagram illustrating an example electronic drawing tool in which the improved technique may be carried out.

FIG. 1 illustrates an example user device 12 in which the improved technique may be carried out.

By way of example, user device 12 is a tablet computer, although in some arrangements, user device 12 may be a desktop computer, laptop computer, or smartphone. User device 12 is configured to take input from a user 20 and translate that input into actions visible on display 16. Such user input may include mouse and/or gesture movements. User device 12 is also configured to run electronic drawing tool 14 and present its output in display 16.

Display 16 is configured to present output from user device 12, specifically electronic drawing tool 14, visually to user 20. In some arrangements, display 16 is a touch display which is configured to accept input form user 20 in the form of touch gestures generated form a finger or fingers of user 20. In other arrangements, display 16 is an external monitor connected to user device by, e.g., VGA cables.

Electronic drawing tool 14 is configured to translate input from user 20 in the form of, e.g., strokes, pokes, clicks, mouse motion, etc., into drawing content within a drawing window 18 visible on display 16. For example, electronic drawing tool 14 may translate a linear mouse movement with a left button depressed into a particular drawing stroke in a specified color and pen type. In another example, electronic drawing tool 14 may translate a finger poke on a touch display on a color icon as a color selection operation and provide indications to that effect.

Drawing window 18 represents the output of electronic drawing tool 14 formatted to be seen by user 20 on display 16. Drawing window 18 as illustrated in FIG. 1 has, aside from a drawing area, a color palette 22 by which user 20 selects a color in which electronic drawing tool 14 displays a drawing stroke in the drawing area.

Color palette 22 is an area within drawing window 18 by which user 20 selects a color in which a drawing stroke is to be rendered on display 16. Color palette 22 includes color icons 24(a), 24(b), 24(c) (color icons 24), each of which represents a color of a drawing stroke 34. It should be understood that the three drawing icons illustrated here are only that number for the purposes of illustration; typically, there will be many more than three such icons 24 within color palette 22.

Each color icon 24 is configured to be displayed within color palette 22 and to have an active or an inactive state. Each color icon 24 has a shape and color that indicates the color of drawing strokes rendered on display 16 when that color icon 24 is active. As illustrated in FIG. 1, the active color icon 24(b) has a solid boundary, while the inactive color icons 24(a0 and 24(c) have dashed boundaries. Alternatively, active color icon 24(b) would be displayed in full brightness, while inactive color icons 24(a) and 24(c) would be displayed dimmer.

Each color icon 24 is further configured to reveal, upon activation via selection by user 20, a pen palette 28 within that color icon 24. For example, when user 20 selects color icon 24(b) to activate it, color icon 24(b) reveals pen palette 28 within color icon 24(b). When user 20 selects another color icon, say, 24(a), to activate it, pen palette 28 appears within color icon 24(a) instead of color icon 24(b).

Pen palette 28 is configured to enable user 20 to select, upon the provision of appropriate input, a pen icon 30 that is indicative of a pen style in which drawing stroke 34 is to be rendered in the drawing area of drawing window 18. For example, pen icon 30(a) may be indicative of a brush stroke, pen icon 30(b) may be indicative of a narrow pen stroke, and pen icon 30(c) may be indicative of a thick pen stroke. When user 20 selects pen icon 30(b), electronic drawing tool 14 highlights pen icon 30(b) by graying out pen icons 30(a) and 30(c), for example. It should be understood that the three pen icons illustrated in FIG. 1 are for demonstration purposes and there may be a different number of pen icons 30 in pen palette 28.

In some arrangements, electronic drawing tool 14 presents a particular highlighted pen icon by default in pen palette 28.

For example, pen icon 30(b) is always highlighted at the first color selection, and remains so until user 20 selects a different pen icon 30. In some further arrangements, upon the re-selection of color icon 24(b), electronic drawing tool 14 remembers the selected pen icon 30(b) and keeps it highlighted as the active pen. Such a feature is useful for a collaborative whiteboard application because one may associate a particular pen with a color, e.g., black for writing using a fountain pen, and a shade of green for painting the background using a brush.

During operation, after user 20 initiates running electronic drawing tool 14 on user device 12, e.g., by clicking on a program icon, user 20 begins a new drawing represented by drawing window 18. In some arrangements, user 20 loads a drawing that had been saved previously.

User 20 begins drawing in drawing window 18 by selecting a color icon, e.g., color icon 24(b) from color palette 22. For example, if user device 12 is a desktop computer with a mouse as input device, then user 20 selects color icon 24(b) by moving a cursor visible on display 16 by moving the mouse, and then clicking a button on the mouse once the cursor is positioned on color icon 24(b). On the other hand, if user device 12 is a tablet computer configured to accept touch gestures on display 16 as input, then user 20 selects color icon 24(b) by poking color icon 24(b) with a finger.

Upon the selection of color icon 24(b), electronic drawing tool 14 causes pen palette 28 to be revealed within color icon 24(b). For example, in some arrangements, electronic drawing tool 14 expands color icon 28 in order to allow all of the pen icons 30 of pen palette 28 to be visible within color icon 24(b).

User 20 then selects a pen icon, e.g., pen icon 30(b), by either clicking a mouse button or poking pen icon 30(b) with a finger. Electronic drawing tool 14 then highlights pen icon 30(b) by, e.g., dimming other pen icons 30(a) and 30(c) within pen palette 28. Upon this selection, user 20 then draws a stroke in the drawing area of drawing window 18 using the mouse or touch gestures; electronic drawing tool 14 renders the stroke according to the selected color icon 24(b) and pen icon 30(b).

User 20 may then select another color/pen combination by clicking on another color, say, color 24(a), upon which electronic drawing tool 14 reveals pen palette 28 within color icon 24(a). In some arrangements, pen icon 30(b) will be selected by default, as pen icon 30(b) was the active pen icon previously selected.

Further details concerning user device 12 are discussed below in connection with FIG. 2.

Figure 2:
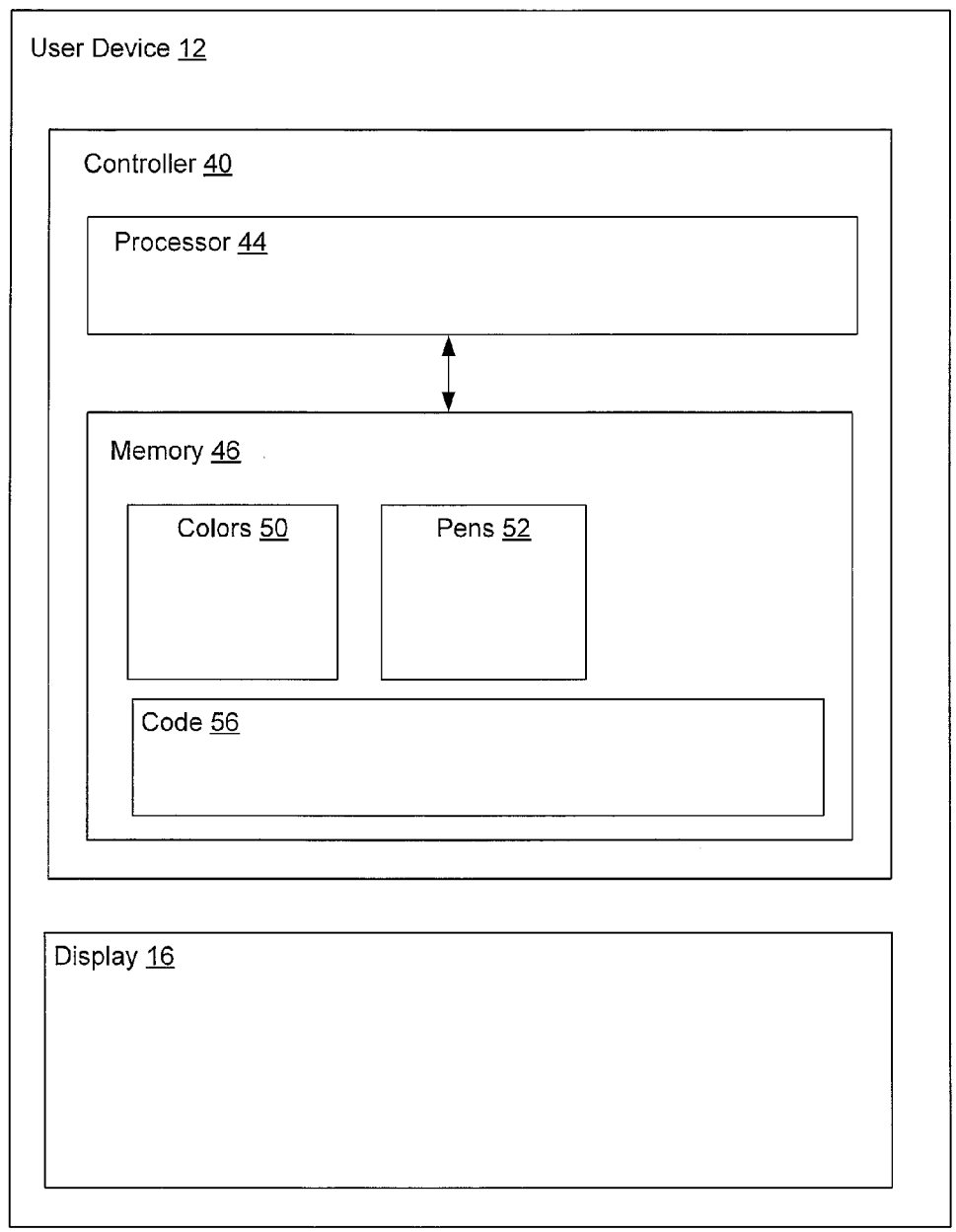
FIG. 2 is bock diagram illustrating an example user device within the electronic drawing tool shown in FIG. 1.

FIG. 2 illustrates an example user device 12. User device 12 includes controller 40, which in turn includes processor 44 and memory 46, and display 16.

Processor 44 takes the form of, but is not limited to, Intel or AMD-based CPUs, and can include a single or multi-cores each running single or multiple threads. Processor 44 is coupled to memory 46 and is configured to execute instructions from code 56.

Memory 46 is configured to store code 56 that contains instructions to operate electronic drawing tool 14 (see FIG. 1). Memory 46 also includes storage for colors 50 and pens 52 used by electronic drawing tool 14 and represented in color icons 24 and pen icons 30, respectively.

Display 16 is configured to present output from user device 12, specifically electronic drawing tool 14, visually to user 20. In some arrangements, display 16 is a touch display which is configured to accept input form user 20 in the form of touch gestures generated form a finger or fingers of user 20. In other arrangements, display 16 is an external monitor connected to user device by, e.g., VGA cables.

During operation, processor 44 receives input from user 20 and processes instructions from code 56 to determine output to be made visible to user 20 on display 16. Specifically, processor 44 translates a selection action from user 20, e.g., a mouse click on a color icon 24, into a revelation of a pen palette 28 within that color icon. A specific instance of such a revelation is described below in connection with FIGS. 3 and 4.

Figure 3:
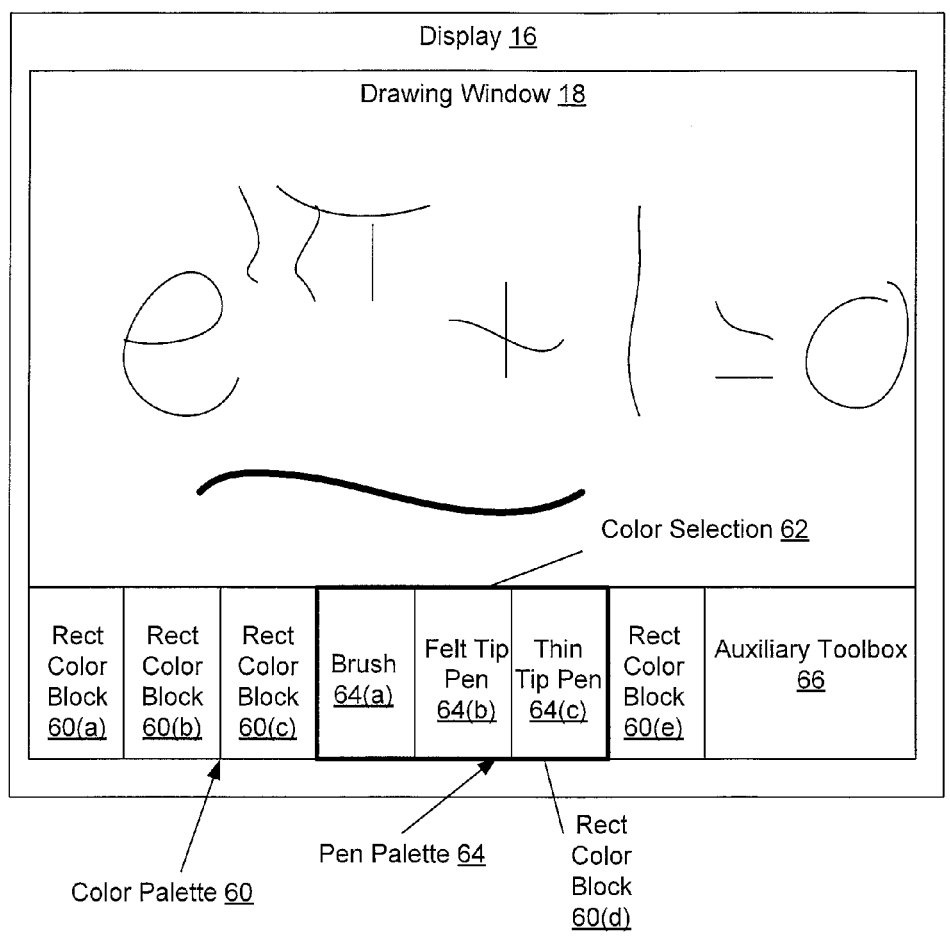
FIG. 3 is a block diagram illustrating an example drawing window within the display of the user device illustrated in FIG. 2.

FIG. 3 illustrates an example drawing window 18 used by electronic drawing tool 14, displayed on display 16. In this particular example, there is a color palette 60 at the bottom of display 16, with rectangular color blocks 60(a), 60(b), 60(c), 60(d), 60(e), etc., arranged in a linear array side-by-side.

In this case, when user 20 selects a color block, say, color block 60(d), processor 44 causes color block 60(d) to expand horizontally to reveal pen palette 64 embedded within the now-expanded color block 60(d). Within pen palette 64 in color block 60(d), there are pen icons 64(a), 64(b), and 64(c). For example, pen icon 64(a) indicates a brush stroke, pen icon 64(b) indicates a felt tip pen stroke, and pen icon 64(c) indicates a thin tip pen stroke.

In some arrangements, drawing window 18 also contains an auxiliary toolbox 66 to one side of color palette 60, e.g., to the right of color palette 60 as illustrated in FIG. 3. Auxiliary toolbox 66 includes tools such as an erase tool, a clear tool, and further editing and file management tools.

Figure 4:
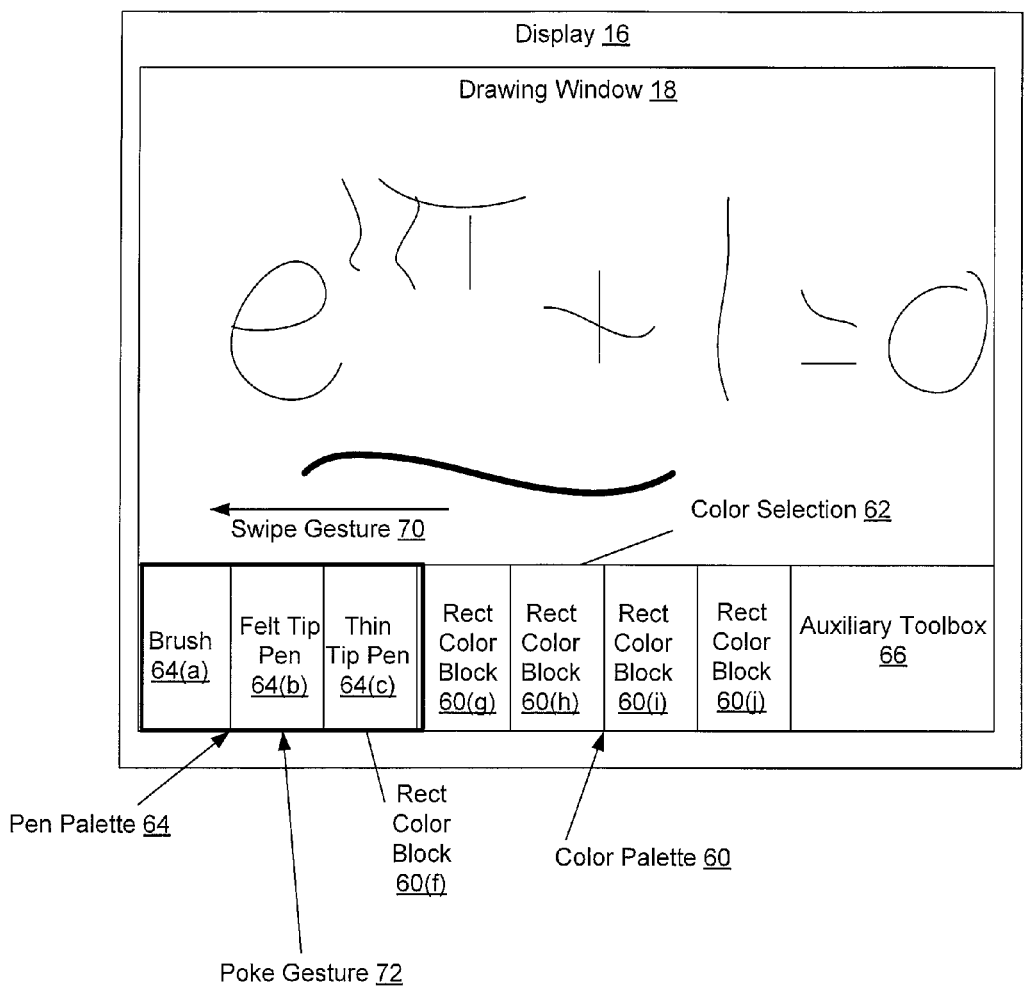
FIG. 4 is a block diagram illustrating an example drawing window within the display of the user device illustrated in FIG. 2.

FIG. 4 further illustrates example drawing window 18 with color palette 60 at the bottom of display 16. In FIG. 4, it is apparent that color palette 60 contains more color icons than those shown in FIG. 3. Electronic drawing tool 14 reveals such additional color icons when user 20 performs particular input actions with the appropriate input device. For example, when display 16 is a touch display and user 20 performs a swipe gesture to the left on display 16 over color palette 60, rectangular color blocks of color palette 60 cycle to the left at a speed indicative of the speed of swipe gesture 70. As illustrated in FIG. 4, electronic drawing tool has moved all of the color icons presented in FIG. 3, i.e., color blocks 60(a), 60(b), 60(c), 60(d), and 60(e), out of display 16 (although these color blocks remain in memory 46). As a result of swipe gesture 70, color palette 60 now contains, as visible color blocks, color blocks 60(f), 60(g), 60(h), 60(i), and 60(j).

User 20 then selects a color block, e.g., color block 60(f), as the active color block using poke gesture 72. In this case, electronic drawing tool 14 expands color block 60(f) as described above to reveal pen palette 28. In some arrangements, if color block 60(f) is only partially visible within display 16, electronic drawing tool 14 will still fully expand color block 60(f) upon detecting poke gesture 72 in order to reveal full pen palette 28.

Figure 5:
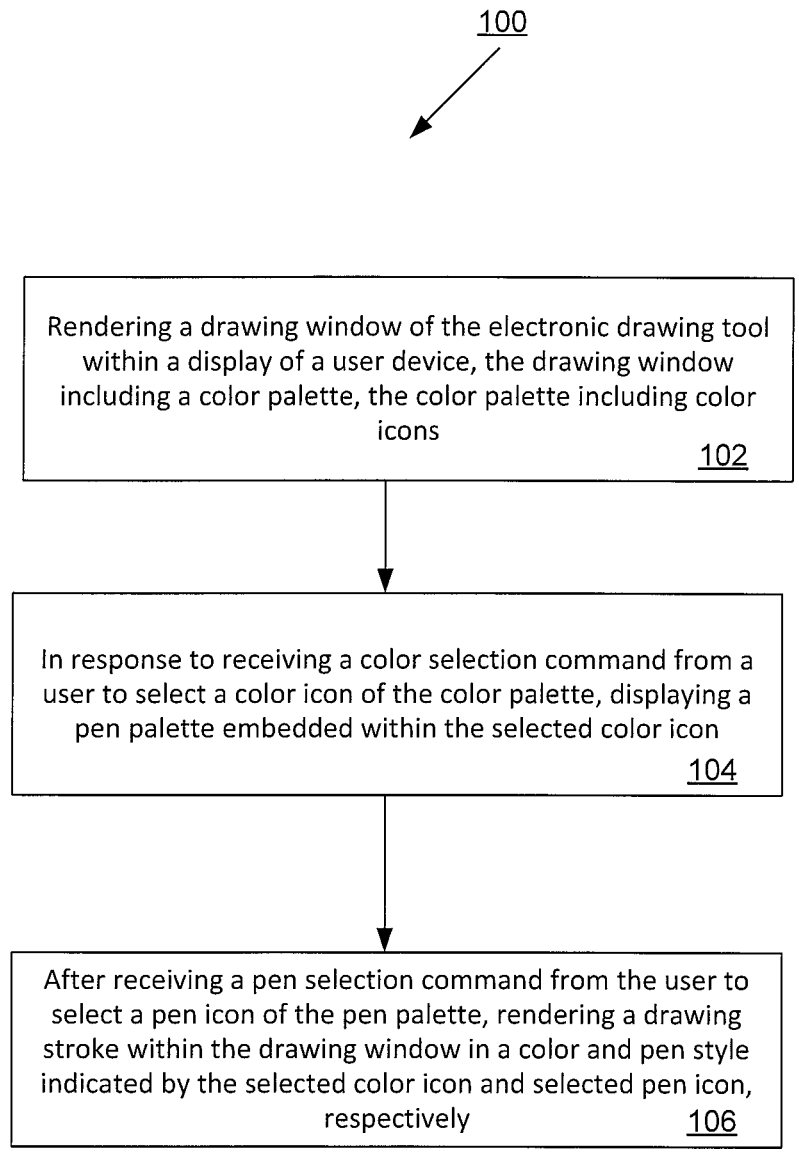
FIG. 5 is a flow chart illustrating an example method of carrying out the improved technique within the computing device shown in FIG. 1.

FIG. 5 illustrates a method 100 of carrying out a method of operating an electronic drawing tool, e.g., electronic drawing tool 14, including steps 102, 104 and 106. In step 102, a drawing window, e.g., drawing window 18 of the electronic drawing tool is rendered within a display, e.g., display 16 of a user device, e.g., user device 12, the drawing window including a color palette, e.g., color palette 60, the color palette including color icons. In step 104, a pen palette, e.g., pen palette 64 embedded within the selected color icon, is displayed within the selected color icon in response to receiving a color selection command, e.g., poke gesture 72, from a user to select a color icon of the color palette. In step 106, a drawing stroke, e.g., drawing stroke 34, is rendered within the drawing window in a color and pen style indicated by the selected color icon and selected pen icon, respectively after receiving a pen selection command from the user to select a pen icon of the pen palette.

As used throughout this document, the words "comprising," "including," and "having" are intended to set forth certain items, steps, elements, or aspects of something in in that these are provided by way of example only and the invention is not limited to these particular embodiments. In addition, the word "set" as used herein indicates one or more of something, unless a statement is made to the contrary.

It should be understood that the improvement described here has a number of applications, including providing a technique for conducting an online meeting.

Having described certain embodiments, numerous alternative embodiments or variations can be made. For example, the above discussion dealt mainly with user device 12 operating electronic drawing tool 14. In some arrangements, however, user device 12 includes a network interface over which user device 12 may exchange data related to electronic drawing tool 14 over a communications medium. For example, user device 12 may use electronic drawing tool 14 in connection with an online meeting and may share drawing data with other users. In this case, electronic drawing tool 14 allows users to quickly and naturally generate drawings within such a collaborative environment.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of operating an electronic drawing tool, the method comprising:
   rendering a drawing window of the electronic drawing tool within a display of a user device, the drawing window including a color palette, the color palette including color icons;
   in response to receiving a color selection command from a user to select a color icon of the color palette, displaying a pen palette embedded within the selected color icon; and
   after receiving a pen selection command from the user to select a pen icon of the pen palette, rendering a drawing stroke within the drawing window in a color and pen style indicated by the selected color icon and selected pen icon, respectively;
   wherein the color icons of the color palette each include a rectangular block having a color that is substantially the color in which the drawing stroke is rendered in the drawing window;
   wherein displaying the pen palette embedded within the selected color icon includes:
   revealing the pen palette within the rectangular block of the selected color icon;
   wherein the method further comprises:
   receiving the color selection command from the user to select a color icon of the color palette; and
   wherein revealing the pen palette within the rectangular block of the selected color icon includes:
   expanding the rectangular block of the selected color icon to display the pen icons of the pen palette.

2. A method as in claim 1,
   wherein rendering the drawing window includes:
   displaying, as the color palette, a linear array of color icons located at an edge of the display.

3. A method as in claim 2, further comprising:
   receiving the pen selection command from the user to select a pen icon of the pen palette; and
   in response to receiving the pen selection command, highlighting the selected pen icon within the expanded rectangular block of the selected color icon.

4. A method as in claim 3, further comprising:
   receiving a second color selection command from the user to select another color icon of the color palette distinct from a current selected color icon;
   receiving a third color selection command from the user to select the current selected color icon; and
   highlighting the pen icon of the pen palette embedded within the current selected color icon that was the highlighted pen icon of the pen palette embedded within the current selected color icon prior to receiving the second color section command.

5. A method as in claim 3,
   wherein the linear array of color icons is located at the bottom of the display of the user device;
   wherein the rectangular block of each color icon of the color palette has a specified width, a sum of the specified widths of the rectangular blocks exceeding a width of the display of the user device;
   wherein receiving the color selection command from the user to select a color icon of the color palette includes:
   receiving a swipe command configured to move the color icons of the color palette toward the left or the right of the display.

6. A method as in claim 5,
   wherein the linear array of color icons is visible within a bounding box within the display of the user device;
   wherein a rectangular block at an edge of the bounding box is partially exposed within the display; and
   wherein expanding the rectangular block of the selected color icon to display the pen icons of the pen palette includes:
   when the selected color icon is a partially exposed rectangular icon, displaying the expanded rectangular block in full within the bounding box.

7. A method as in claim 5,
   wherein the drawing window further includes an auxiliary function bar for invoking auxiliary functions within the drawing window; and
   wherein rendering the drawing window of the electronic drawing tool within the display of the user device includes:

displaying the bounding box to one side of the bounding box.

8. A method as in claim 5,
wherein the display of the user device is a touch display configured to respond to touch gestures from the user; and
wherein receiving the swipe command includes:
detecting a swipe gesture on the display, a direction of motion of the linear array of color icons across the display being based on a direction of the detected swipe gesture.

9. A method as in claim 8,
wherein receiving the color selection command from the user to select a color icon of the color palette further includes:
detecting a poke gesture on a color icon of the color palette, and
designating, as the selected color icon, the color icon of the color palette on which the poke gesture was detected.

10. A method as in claim 9,
wherein receiving the pen selection command from the user to select a pen icon of the pen palette includes:
detecting a poke gesture on a pen icon of the pen palette, and
designating, as the selected pen icon, the pen icon of the pen palette on which the poke gesture was detected.

11. An electronic apparatus constructed and arranged to operate an electronic drawing tool, the apparatus comprising a user device that includes:
a display;
memory; and
a controller having controlling circuitry, the controlling circuitry being constructed and arranged to:
render a drawing window of the electronic drawing tool within the display of the user device, the drawing window including a color palette, the color palette including color icons;
in response to receiving a color selection command from a user to select a color icon of the color palette, display a pen palette embedded within the selected color icon; and
after receiving a pen selection command from the user to select a pen icon of the pen palette, render a drawing stroke within the drawing window in a color and pen style indicated by the selected color icon and selected pen icon, respectively;
wherein the color icons of the color palette each include a rectangular block having a color that is substantially the color in which the drawing stroke is rendered in the drawing window;
wherein the controlling circuitry constructed and arranged to display the pen palette embedded within the selected color icon is further constructed and arranged to:
reveal the pen palette within the rectangular block of the selected color icon;
wherein the controlling circuitry is further constructed and arranged to:
receive the color selection command from the user to select a color icon of the color palette; and
wherein the controlling circuitry constructed and arranged to reveal the pen palette within the rectangular block of the selected color icon is further constructed and arranged to:
expand the rectangular block of the selected color icon to display the pen icons of the pen palette.

12. An apparatus as in claim 11,
wherein the controlling circuitry constructed and arranged to render the drawing window is further constructed and arranged to:
display, as the color palette, a linear array of color icons located at an edge of the display.

13. An apparatus as in claim 12, wherein the controlling circuitry is further constructed and arranged to:
receive the pen selection command from the user to select a pen icon of the pen palette; and
in response to receiving the pen selection command, highlight the selected pen icon within the expanded rectangular block of the selected color icon.

14. An apparatus as in claim 13,
wherein the controlling circuitry is further constructed and arranged to:
receive a second color selection command from the user to select another color icon of the color palette distinct from a current selected color icon;
receive a third color selection command from the user to select the current selected color icon; and
highlight the pen icon of the pen palette embedded within the current selected color icon that was the highlighted pen icon of the pen palette embedded within the current selected color icon prior to receiving the second color section command.

15. An apparatus as in claim 13,
wherein the linear array of color icons is located at the bottom of the display of the user device;
wherein the rectangular block of each color icon of the color palette has a specified width, a sum of the specified widths of the rectangular blocks exceeding a width of the display of the user device;
wherein the controlling circuitry constructed and arranged to receive the color selection command from the user to select a color icon of the color palette is further constructed and arranged to:
receive a swipe command configured to move the color icons of the color palette toward the left or the right of the display.

16. A computer program product having a non-transitory, computer-readable storage medium which stores instructions that, when executed by a controller, causes the controller to carry out a method of operating an electronic drawing tool, the method comprising:
rendering a drawing window of the electronic drawing tool within a display of a user device, the drawing window including a color palette, the color palette including color icons;
in response to receiving a color selection command from a user to select a color icon of the color palette, displaying a pen palette embedded within the selected color icon; and
after receiving a pen selection command from the user to select a pen icon of the pen palette, rendering a drawing stroke within the drawing window in a color and pen style indicated by the selected color icon and selected pen icon, respectively;
wherein the color icons of the color palette each include a rectangular block having a color that is substantially the color in which the drawing stroke is rendered in the drawing window;
wherein displaying the pen palette embedded within the selected color icon includes:
revealing the pen palette within the rectangular block of the selected color icon;

wherein the method further comprises:
   receiving the color selection command from the user to select a color icon of the color palette; and
wherein revealing the pen palette within the rectangular block of the selected color icon includes:
expanding the rectangular block of the selected color icon to display the pen icons of the pen palette.

\* \* \* \* \*